(No Model.)
J. K. HIPPLE & VAN L. WOLF.
VEHICLE SPRING.
No. 507,129.  Patented Oct. 24, 1893.
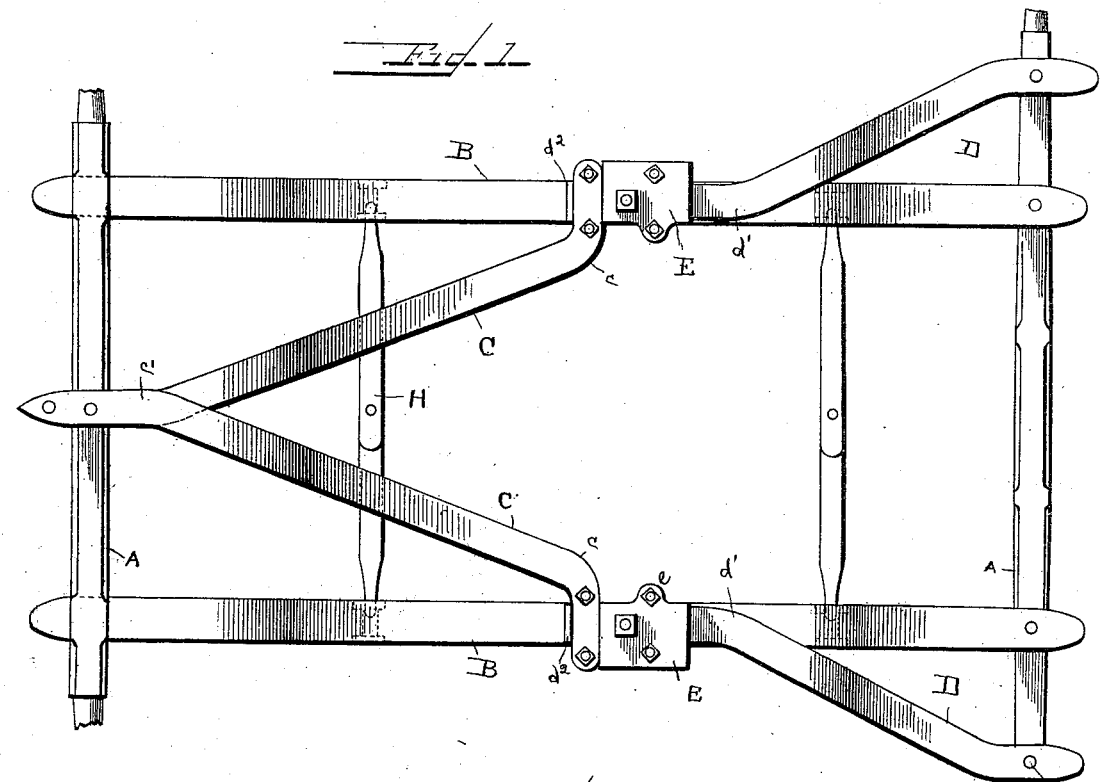
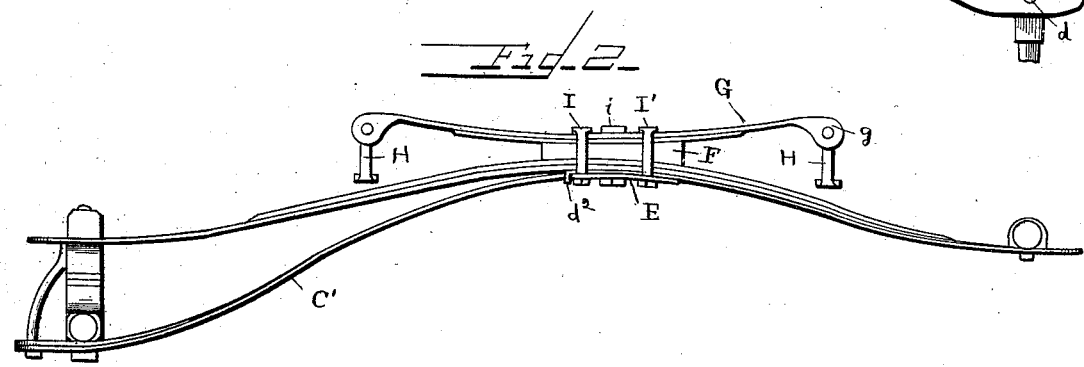
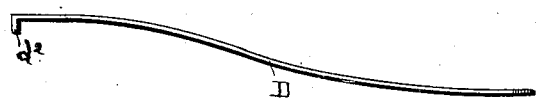
Witnesses
G. A. Tauberschmidt
T. A. Burns
Inventors
John K. Hipple and
Van Luther Wolf
By Edwin S. Clarkson
their Attorney

UNITED STATES PATENT OFFICE.

JOHN KING HIPPLE AND VAN LUTHER WOLF, OF MEDIA, PENNSYLVANIA.

VEHICLE-SPRING.

SPECIFICATION forming part of Letters Patent No. 507,129, dated October 24, 1893.

Application filed January 24, 1893. Serial No. 459,522. (No model.)

*To all whom it may concern:*

Be it known that we, JOHN KING HIPPLE and VAN LUTHER WOLF, citizens of the United States, residing at Media, in the county of Delaware and State of Pennsylvania, have invented certain new and useful Improvements in Vehicles; and we do hereby declare the following to be a full, clear, and exact description of the invention, such as will enable others skilled in the art to which it appertains to make and use the same.

Our invention relates to an improved spring vehicle, and has for its object, a simple and effective spring which is cheaply manufactured, extremely durable and gives an even spring movement under any and all circumstances; obviates all strain on the parts thus producing an easy riding and even traveling vehicle; and with these objects in view the invention consists of the parts and combination of parts as will hereinafter be more fully set out and claimed.

In the drawings: Figure 1 is a bottom plan view of the improved spring running gear. Fig. 2 is a side elevation. Fig. 3 is a detail view.

A represents the axles of the running gear, of any approved pattern.

B are the side springs, also of any approved pattern.

C and C' are the front reach bars composed of spring metal, the rear ends of which are bent at an angle to the main body, as at $c$ and provided with ordinary bolt holes. The forward ends of these spring reach bars are bent in such a manner that they will lap each other at $c'$ when they are secured by the "king bolt" to the front axle.

D are the rear reach bars secured at one end to the rear axle at $d$, near the end of the same. The forward ends of these rear reach bars are bent at $d'$ in order that they may, for a suitable distance, lay directly under the side springs B thus affording additional support for said side springs. The extreme forward end of each of these reach bars D is turned up at right angles at $d^2$, behind which the end $c$ of the reach bar C is secured.

E is a combined lock and "rub iron or plate" which is provided with a suitable projection having an opening.

On each side spring a block F is secured on which rests body hanger springs G, the ends of which are each "struck up" to form ears $g$ and a housing for the bearings of the body hanger H thereby protecting said bearings from the rain and dust.

I are clips which bind or secure the body hanger spring, block, side spring and front reach bars together and I' are clips which secure the body hanger spring, block, side spring rear reach bars and the combined lock and "rub iron" together and $i$ are bolts passing through all of the last above named.

It will readily be seen that the reach bars will be effective in their operation as they cannot slide, thus relieving all unequal strain from the parts, thereby obviating "stripping" breaking and rattling of the bolts. Particular stress is laid upon the manner of locking the reach bars on the side springs.

It is obvious that many slight changes and alterations may be made in the parts and combination of parts herein before described and hence we would have it understood that we do not strictly confine ourselves to the specific construction shown.

What we claim, and desire to secure by Letters Patent, is—

1. The combination with the side springs, of spring reach bars one end of which is bent at right angles and the forward reach bars the rear ends of which are bent at an angle and adapted to engage the bent portion of the first named reach bars.

2. In a vehicle having spring side bars, the combination of the rear reach bars the forward ends of which are bent at right angles, of the forward reach bars the rear ends of which are bent at an angle and are adapted to engage the bent portion of the rear reach bars, and a combined locking plate and rub iron adapted to hold the front reach bars in engagement with the rear reach bars.

In testimony whereof we affix our signatures in presence of two witnesses.

JOHN KING HIPPLE.
VAN LUTHER WOLF.

Witnesses:
A. P. OTTEY,
HARRY P. OTTEY.